United States Patent [19]

Graham

[11] Patent Number: 5,286,544
[45] Date of Patent: Feb. 15, 1994

[54] OIL AND RUBBER TREATED ROOFING GRANULES

[75] Inventor: Joseph Graham, Plymouth, Minn.

[73] Assignee: Minnesota Mining and Manufacturing Company, St. Paul, Minn.

[21] Appl. No.: 574,264

[22] Filed: Aug. 28, 1990

[51] Int. Cl.$^5$ .............................................. B32B 7/04
[52] U.S. Cl. ..................................... 428/144; 427/186; 427/187; 427/214; 427/215; 427/221; 427/384; 427/385.5; 427/387; 428/403; 428/407; 428/492
[58] Field of Search ................ 428/141, 143, 144, 285, 428/402, 403, 407, 147, 492; 427/186, 187, 384, 385.5, 387, 214, 215, 221

[56] References Cited

U.S. PATENT DOCUMENTS

| | | | |
|---|---|---|---|
| 2,595,465 | 5/1952 | Keene et al. | 117/27 |
| 2,927,045 | 3/1960 | Lodge et al. | 117/100 |
| 3,265,765 | 8/1966 | Holdeu et al. | 260/876 |
| 3,397,073 | 8/1968 | Fehner | 117/27 |
| 3,752,696 | 8/1973 | Beyard et al. | 117/100 D |
| 3,888,684 | 6/1975 | Little | 106/15 AF |
| 3,917,607 | 11/1975 | Crossland et al. | 260/28.5 B |
| 4,032,491 | 6/1977 | Schoenke | 260/28.5 AS |
| 4,359,505 | 11/1982 | Joedicke | 428/404 |
| 4,378,408 | 3/1983 | Joedicke | 428/403 |
| 4,588,634 | 5/1986 | Pagen et al. | 428/283 |
| 4,668,315 | 5/1987 | Brady et al. | 156/71 |
| 4,824,880 | 4/1989 | Algrim et al. | 524/62 |
| 4,882,384 | 11/1989 | Willis et al. | 525/105 |
| 4,895,754 | 1/1990 | Graham et al. | 428/289 |
| 5,011,726 | 4/1991 | Chich et al. | 428/141 |

OTHER PUBLICATIONS

Sales Literature, "Kraton Thermoplastic Rubber," pp. 1-13, 16, Shell Oil Co. Sales Offices, Oak Brok, Ill.

*Primary Examiner*—Paul J. Thibodeau
*Assistant Examiner*—H. Thi Lê
*Attorney, Agent, or Firm*—Gary L. Griswold; Walter N. Kirn; Karl G. Hanson

[57] ABSTRACT

Roofing granules having surfaces treated with an oil and an elastomeric rubber. The elastomeric rubber can be an organic block copolymer having elastomeric and nonelastomeric repeating units. The oil and rubber are applied to the roofing granules' surfaces as a thin film. The thin film of oil and rubber impedes granule staining from oils in asphalt roofing materials, and reduces dust formation during granule handling. Also disclosed is a roofing shingle and a process for making the roofing granule composition.

28 Claims, 1 Drawing Sheet

OIL AND RUBBER TREATED ROOFING GRANULES

FIELD OF THE INVENTION

This invention relates to oil and rubber treated roofing granules, roofing materials which use such oil and rubber treated roofing granules, a method of treating roofing granules, and a method of forming asphalt-based roofing materials.

BACKGROUND OF THE INVENTION

In North America, asphalt-based roofing materials are a popular medium for covering roofs on homes and other structures. Asphalt-based roofing materials may come in shingle or roll form, the shingle being the more widely used material. A typical asphalt shingle has an asphalt substrate and a multitude of roofing granules placed thereon. The roofing granules serve an aesthetic function by providing color to the shingle and thus to the roof.

Colored roofing granules have been prepared in the following manner. First, mineral rock granules of about 420–1680 micrometers (40 to 12 US mesh) are preheated to around 100°–1000° F. (38°–538° C.). A paint slurry containing a pigment is then applied to the heated granules in a mixer. The color coated granules are then further heated in a kiln to about 350° to 1200° F. (175°–650° C.), are cooled, and are subsequently passed to a post-treatment stage where the colored granules are treated with an oil formulation in a rotary mixer. The oil formulation is applied to reduce dust and promote adhesion of the granules to the asphalt substrate. After the oil treatment, the granules are removed from the post-treatment stage, transported, and subsequently applied to the asphalt substrate.

When the granules are secured to an asphalt substrate, it has been found that there is a tendency for oils in the asphalt substrate to creep onto or be adsorbed on the granules' surfaces. This creeping or adsorption of the asphaltic oils on the roofing granules' surfaces causes a discoloration (staining) of the roofing granules and hence the shingles. Although the discoloration is normally removed by weathering after the shingles are placed on a roof, there is nonetheless a disparity in color between what the consumer sees at the time of purchase and what the ultimate color of roof becomes after weathering. This color disparity is especially emphasized when the shingles have a lighter color, particularly white.

The present invention is directed to overcoming the problem of having asphaltic oils adsorb onto and stain the surface of roofing granules. This and other objects and advantages of the invention will be more fully understood in the following description and accompanying figures. It is to be expressly understood, however, that the description and figures are for purposes of illustrating the invention and should not be read in a manner that would unduly limit the definition of this invention.

SUMMARY OF THE INVENTION

This invention relates to a roofing granule composition that limits the ability of asphaltic oils to creep onto the surface of the roofing granules. The inventor has found that by applying an elastomeric rubber material to the surface of roofing granules, asphaltic oils have a greatly reduced tendency to be adsorbed onto the surface of the roofing granules. Granule staining is severely diminished; the intended color of the roofing granules is thus preserved. Surprisingly, it has also been found that by applying elastomeric rubber materials to the surfaces of roofing granules, the roofing granules' ability to create undesired dust is greatly minimized. A reduction in dust creation is desirable because it substantially improves the working environment around where granules are being handled in bulk quantities.

In another aspect, the present invention relates to a roofing shingle having granules coated with an oil and an elastomeric rubber material. In a further aspect, the present invention is directed to processes for preparing roofing granules and shingles, and is also directed to a process for covering a roof with shingles.

DETAILED DESCRIPTION OF PREFERRED EMBODIMENTS OF THE INVENTION

Figure 1:
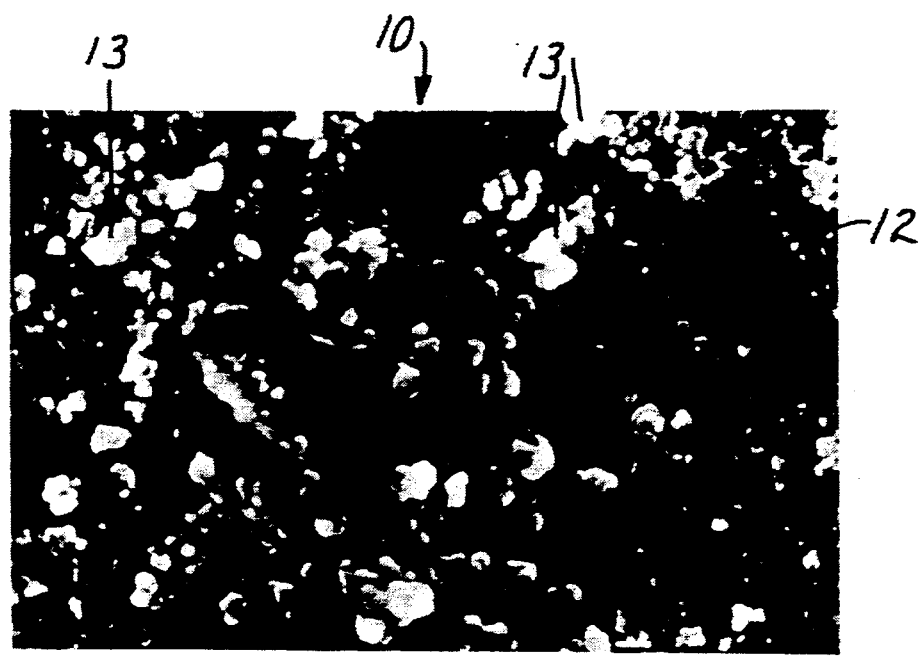
FIG. 1 is a photograph (magnified 5000×) of a roofing granule 10 that has been treated with oil and silicone resin according to the procedure outlined in Example 9 below.

In the practice of the present invention, asphalt oil creep and roofing granule dust creation are greatly reduced by providing a roofing granule composition that includes a plurality of roofing granules treated with an oil and an elastomeric rubber.

Roofing granules used in the present invention may include any conventional roofing granules used for manufacturing roofing materials. The granules thus may, for example, be of material such as greenstone, nephylene syenite, common gravel slate, gannister, quartzite, greystone, etc. Granules typically used are in sizes ranging from about 420°–1680 micrometers (40 to 12 mesh US). The use of larger or smaller granules is within the scope of this invention.

Oils selected for treating the roofing granules may be any oil that is compatible with the roofing granule and the elastomeric rubber materials. The oil would typically be one of three petroleum oils: (1) paraffinic oils; (2) naphthenic oils; and (3) aromatic oils, or would be a mixture thereof. It has been found that these three petroleum oils are particularly suitable for use with the roofing granules because they modify the surfaces of the granules to promote adhesion of the granules to the asphalt substrate. Of the three petroleum oils, paraffinic and naphthenic oils are preferred over aromatic oils because the former have a more favorable flash point.

Oils having a predominant number of paraffin chain carbons (typically 55% $C_p$ or more) are generally considered paraffin oils. Naphthenic oils are generally characterized by having a large number of naphthene ring carbons (typically 35% or more $C_n$). Aromatic oils, on the other hand, generally have a large number of aromatic ring carbons (typically 35% $C_a$ or more). It will be appreciated that the oil employed can include a mixture of any of these three kinds of oils, for example an aromatic/paraffinic oil, or the oil could be a mixture of a petroleum oil with any other suitable oil.

The oil(s) used for treating the roofing granules should be applied in an amount that permits an adequate quantity of granules to be sufficiently coated, but not to such an extent that the quality of the shingle would be compromised. Oil is preferably employed in the roofing granule composition at between 1.0 and 6.0 pounds per ton of untreated roofing granules (0.05 and 0.3 weight percent). More preferably, the oil is present in the roofing granule composition between 1.5 lbs. to about 4 lbs. per ton of base mineral (0.075 to about 0.2 weight percent).

Before the present invention and without the introduction of an elastomeric rubber material in the oil roofing granule composition, oil has been introduced in the post-treatment stage at about 6°–12 pounds per ton of roofing granules (0.3 to 0.6 wt. %). Thus, the use of the elastomeric rubber material provides another advantage in that there is a great reduction in the amount of oil used to treat the granules.

The elastomeric rubber material may be of any synthetic or naturally occurring rubber or elastomer which is compatible with the oil and roofing granules. An elastomeric rubber is considered to be compatible when it has an ability to exist in close and relatively permanent association with the oil. Preferred elastomeric rubbers are those that are copolymers of non-elastomeric monomer units and elastomeric monomer units. The copolymers preferably have a block structure that includes at least one A block polymer and at least one B block polymer. The copolymers may, for example, have an A-B-A structure, an A-B, or an (A-B)$_n$ structure, where A represents a non-elastomeric polymer block, and B represents an elastomeric polymer block. The designation A-B-A includes (but is not limited to) what are sometimes called A-C-A block copolymers, where C represents a "tapered" midblock. U.S. Pat. No. 3,265,765 describes A-C-A block copolymers having tapered midblocks C. The blocks are referred to as being tapered because they contain an increasing ratio from one end to the other of monomer units of the A block. The designation A-B-A also includes (but is not limited to) what are referred to as A-B-C block copolymers, where C here represents an endblock similar to, but different from endblock A; for example, where A and C are different but are both derived from styrene or styrene homologues.

The non-elastomeric polymer block A preferably has an average molecular weight of between 2,000 and 125,000 and has a glass transition temperature (Tg) above about 67° F. (20° C.). More preferably, the non-elastomeric polymer block A has an average molecular weight of between 5,000 and 50,000 and has a Tg of about 125° F. (52° C.). Preferred non-elastomeric end blocks include polymer blocks of alkenyl aromatic hydrocarbons. Preferred alkenyl aromatic hydrocarbon blocks include vinyl aromatic polymer blocks made from one or more monovinyl aromatic hydrocarbons of the benzene series. Representative examples of vinyl aromatic hydrocarbons are styrene, vinyl toluene, vinylxylene, ethylvinyl benzene, isopropylstyrene, ethylvinyltoluene, and tert-butylstyrene. A particularly preferred non-elastomeric polymer block is composed of styrene monomer units.

Although polymer blocks of alkenyl aromatic hydrocarbons are preferred, the non-elastomeric polymer block could conceivably comprise, for example, homopolymers of lower olefins such as polyethylene or polypropylene as well as polyacrylonitriles, polymethyl methacrylates, polymethyl styrene or polychloro styrene, or other non-elastomeric polymeric chains.

The elastomeric polymer block is desirably composed of saturated or unsaturated monomer units of low molecular weight hydrocarbons. Unsaturated monomer units are preferably conjugated dienes such as butadiene and isoprene. The unsaturated block copolymers may be modified by hydrogenation to form a saturated or substantially saturated elastomeric polymer block. Discussions of saturated elastomeric polymer blocks are contained in U.S. Pat. Nos. 3,917,607 and 4,882,384. Examples of saturated or substantially saturated elastomeric monomer units are ethylene/butylene and ethylene/propylene.

The elastomeric polymer block B preferably has an average molecular weight of between 10,000 and 1,000,000 and has a Tg of less than 50° F. (10° C.). More preferably, the polymer block B has an average molecular weight of between 25,000 and 150,000 and has a Tg of below 32° F. (0° C.), most preferably below −15° F. (−26° C.).

It is preferred that the non-elastomeric polymer blocks A and the elastomeric polymer blocks B have differing glass transition temperatures (ΔTg). Preferably, ΔTg would be greater than 105° F. (40° C.), more preferably greater than 212° F. (100° C.), and most preferably greater than 255° F. (124° C.). The non-elastomeric portion of the elastomeric rubber preferably constitutes 10°–50 wt. % (better 15–40%) of the total polymer weight.

Examples of preferred block copolymers useful as the elastomeric rubber component of the present invention include styrene-butadiene-styrene (SBS), styrene-isoprene-styrene (SES), styrene-ethylene/butylene-styrene (SEBS), styrene-butadiene (SB), styrene-ethylene/propylene (SEP), and styrene-ethylene/butylene (SEB). These preferred block copolymers are available from Shell Oil Co. and are marketed under the trademark KRATON. Block copolymers containing non-elastomeric and elastomeric monomer units may be prepared according to known copolymerization procedures.

Although copolymers of non-elastomeric and elastomeric monomeric units are preferred in the present invention, it is not beyond the scope of this invention to select elastomeric rubber materials such as natural rubber, butyl rubbers, neoprenes, ethylene propylene rubbers, nitrile elastomers such as acrylonitrilebutadiene rubber, polyacrylic rubbers, polysulfied rubbers (e.g. Thiokol ®), silicone elastomers, thermoplastic elastomers, polyurethanes, fluoroelastomers, etc. or mixtures thereof.

The elastomeric rubber is applied to the roofing granules' surfaces in an amount sufficient to hinder asphaltic oil creep or to reduce dust formation. The amount of elastomeric rubber may vary depending on the particular application. For instance, if black roofing granules are being treated, the elastomeric rubber is used to the extent that dust formation is lowered; there is no particular need to reduce asphaltic oil creep because staining is not noticeable. On the other hand, if white roofing granules are being treated, asphaltic oil creep becomes a factor; the rubber should be used in an amount sufficient to reduce granule staining. The amount of elastomeric rubber may also vary depending on the particular rubber selected and its compatibility with the chosen oil. Generally, the elastomeric rubber is present in the roofing granule composition at between about 0.05 and 6.0 pounds per ton of untreated roofing granules (0.0025 and 0.3 weight percent). Preferably, the elastomeric rubber would be present at between 0.1 and 1.0 pound per ton of untreated roofing granules (0.005 and 0.05 weight percent). Most preferably, the elastomeric rubber would be present at between 0.2 and 0.4 pounds per ton of untreated roofing granules (0.01 and 0.02 wt. %).

It will be understood that other additives may be introduced into the roofing granule composition. For example, as skilled artisans are aware, a silicone additive can also be used in granule treatment. Silicone additives may, for example, be employed at about 0.0025 to 0.025 weight percent based on the weight of base mineral in the post-treatment operation.

The roofing granules may be treated with an oil and an elastomeric rubber material (and other additives) in the conventional post-treatment stage; that is, after a color has been fixed to the granules. It is preferred to introduce the elastomeric rubber component to the roofing granules at this stage because there would not have to be any material alteration to the coloration operation. The oil and elastomeric rubber are preferably mixed with the colored roofing granules in a suitable mixing device such as a rotary mixer or rotary cooler. The oil and elastomeric rubber are mixed with the granules for a time sufficient to ensure adequate contact of the oil and rubber with the roofing granules. This time may vary depending on of the particular application.

The elastomeric rubber is preferably fed into the mixer at a rubber to oil weight ratio of 0.1:6.0 to 1.0:1.0, more preferably 0.2:4.0 to 0.4:1.5. The oil and elastomeric rubber should generally be used in quantities that permit a thin film to form on the surface of the roofing granules. The rubber component should not be used to such an extent that it would hinder granule flowability during subsequent operations.

Although the roofing granules treated with oil are typically colored, non-colored or natural granules may also be used. Such granules would also be mixed with an oil and elastomeric rubber to promote granule adhesion to the asphalt substrate and to reduce dust formation and impede granule staining (if needed).

It is preferred to introduce the elastomeric rubber to the roofing granules in the form of an aqueous dispersion. Aqueous dispersions may be obtained from Pierce and Stevens Corporation (a division of A. Pratt and Lambert Company), which markets the dispersions under the trademark PRINLIN. PRINLIN dispersions are prepared as a solution of KRATON rubber in an organic solvent. The KRATON rubber and organic solvent are dispersed in water with a hydrogenated resin ester. Most of the solvent is stripped off from this solution with mild heat and/or vacuum to provide an aqueous dispersion of the rubber.

Aqueous dispersions are preferred because they assist in the coating of the roofing granules in the post-treatment stage. The dispersion may be added to cooling water in a rotary mixer unit just prior to adding oil, and other optional additives, e.g., silicone components. The excess water helps spread the dispersion over the surface of roofing granules. As the granules are still hot at this point, the water cools the granules and readily evaporates off. A rubbery, sticky adhesive is then formed on the roofing granules, which tends to bind loose dust on the granules' surfaces.

Another method for coating the roofing granules is to mix an aqueous dispersion of an elastomeric rubber with oil, and other optional additives such as silicone, to form a water-in-oil or an oil-in-water dispersion. This dispersion can be prepared at ambient temperature and can be contacted to the roofing granules in a rotary mixer, where the water phase would be driven off and a sticky adhesive would be formed about the granules.

As an alternative to an aqueous dispersion, another solvent may be used in lieu of (or in combination with) water in the above-noted methods. The solvent selected preferably would volatilize during the post-treatment stage and would not be pejorative to the treatment process. Examples of other solvents may include toluene and xylene.

A further method of introducing the elastomeric rubber is to dissolve the rubber component in a compatible oil. The solution of oil and rubber may be formed by heating the components to about 250°–350° F. (121°–177° C.) and mixing them together in a suitable mixer. This solution is preferably applied while it is hot (above 175° F. (79° C.)) to keep it in a pumpable consistency.

After the roofing granules are treated with oil and an elastomeric rubber, the granules are removed from the post treatment stage and may be shipped to a location where the granules are later placed on an asphalt substrate.

An asphalt substrate typically includes a base mat covered with an asphalt that is filled with a mineral filler or stabilizer. An asphalt is a cementitious material having bitumens as a main constituent. A filler is typically in powder form (approximately 44–200 micrometers), and has been included in the range of from 0 to 70 percent by weight of the total asphalt composition. Examples of asphalt fillers are: limestone, dolomite, nephylene syenite, or ground shale.

Asphalt-based roofing materials are formed by providing an asphalt substrate, and applying roofing granules to at least a portion of the substrate.

An asphalt substrate is typically formed by the following steps: (a) mixing a molten asphalt and a heated filler in a mixer; and (b) conveying a paper, felt, or fiberglass mat or web through a coating apparatus which coats the mat with the filled molten asphalt (typically by means of coating rolls).

Roofing granules may be applied to the substrate, for example, by dropping them onto a hot asphalt surface of the asphalt substrate.

After the granules are applied, the coated mat is cooled. Typically, a release agent is then applied to the backside of the coated mat, and a sealer is applied to a portion of the mat. To form a shingle, the mat is cut to the appropriate shape.

Shingles may be applied to a roof in a few different ways. For example, the shingles may be nailed using roofing nails, or they may be stapled. Such methods of applying shingles are well known to those skilled in the art, and therefore need no further description.

This invention's objects and advantages are further illustrated in the following examples. It should be understood, however, that while the examples serve this purpose, the particular materials and amounts used are only exemplary and should not be construed in a manner that would unduly limit the metes and bounds of this invention.

EXAMPLE 1

COMPARATIVE SAMPLE 1000 grams of untreated, kiln fired, white roofing granules were heated to 360° F. (182° C.) and poured into a gallon size stainless steel beaker secured to a paint shaker. 30 grams of water were added to the steel beaker, followed almost immediately by dropwise addition of a dispersion of 0.1 grams of silicone resin (CR-139 available from General Electric Co.) in 3.0 grams of naphthenic oil. The components were mixed together on the paint shaker for five minutes. After shaking, the granules were removed and placed in an oven at 175° F. (79° C.) for one hour. The granules were removed from the oven and were allowed to cool.

After cooling to ambient temperature, the treated granules were then tested for: (i) Hunter color L* for both deoiled and oiled granules, (ii) dust level generated when granules are handled and (iii) the tendency of the roofing granules to adsorb asphaltic oils in a shingle construction (4-day stain result).

The results of these tests are tabulated in column 1 of Table 1.

EXAMPLE 2

1000 grams of untreated, kiln fired, white roofing granules were heated to 360° F. (182° C.) and poured into a gallon size stainless steel beaker secured to a paint shaker. A solution containing 29.75 grams of water and 0.25 grams of B7137X1 PRINLIN dispersion was added to the beaker, followed almost immediately by dropwise addition of a dispersion of 0.1 grams of silicone resin (CR-139 available from General Electric Co.) in 0.75 grams of naphthenic oil. The components were mixed together for five minutes on the paint shaker, and the granules were removed and placed in an oven at 175° F. (79° C.) for one hour. The granules were removed from the oven and were allowed to cool. A B7137X1 dispersion contains 43 wt. % solids of an SIS block copolymer, elastomeric rubber component.

After cooling to ambient temperature, the treated granules were then tested for: (i) Hunter color L* for both deoiled and oiled granules, (ii) dust level generated when granules are handled, and (iii) the tendency of the roofing granules to adsorb asphaltic oils in a shingle construction (4-day stain result).

The results of these tests are tabulated in column 2 of Table 1.

EXAMPLE 3

Test sample was prepared as in Example 2 except B7138A PRINLIN was used instead of B7137X1. A B7138A PRINLIN dispersion contains 41.5 wt. % solids of an SEBS block copolymer, elastomeric rubber component. Granules were tested as indicated in Example 2. The results of those tests are tabulated in column 3 of Table 1.

EXAMPLE 4

Test sample was prepared as in Example 2 except B7248A PRINLIN was used instead of B7137A. A B7278A PRINLIN dispersion contains 38 wt. % solids of a SEBS block copolymer, elastomeric rubber compound. Granules were tested as indicated in Example 2. The results of those tests are tabulated in column 4 of Table 1.

EXAMPLE 5

Test sample was prepared as in Example 2 except B7216A PRINLIN was used instead of B7137A. A B7216A PRINLIN dispersion contains 43 wt. % solids of a SBS block copolymer, elastomeric rubber compound. Granules were tested as indicated in Example 2. The results of those tests are tabulated in column 5 of Table 1.

TABLE 1

| | Test Sample of Example: | | | | |
|---|---|---|---|---|---|
| | 1 | 2 | 3 | 4 | 5 |
| Additive (wt % based on weight of untreated roofing granules) | | | | | |
| B7137X1 dispersion | 0.0 | 0.025 | 0.0 | 0.0 | 0.0 |
| B7138A dispersion | 0.0 | 0.0 | 0.025 | 0.0 | 0.0 |
| B7248A dispersion | 0.0 | 0.0 | 0.0 | 0.025 | 0.0 |
| B7216A dispersion | 0.0 | 0.0 | 0.0 | 0.0 | 0.025 |
| Naphthenic oil | 0.3 | 0.075 | 0.075 | 0.075 | 0.075 |
| Silicone resin | 0.01 | 0.01 | 0.01 | 0.01 | 0.01 |
| Properties | | | | | |
| L* (deoiled) | 69.47 | 69.93 | 70.02 | 70.17 | 70.09 |
| ΔL* (deoiled-oiled) | 2.83 | .96 | 1.04 | 0.96 | .58 |
| Dust Count (particles/cc) | 198 | 62 | 66 | 94 | 72 |
| 4-Day stain result | 3.2 | 1.2 | 1.0 | 0.7 | 0.5 |

In Table 1, L* indicates the "Hunter color L*", a conventional test for lightness where a L* value of 100 represents a perfectly white sample. ΔL* indicates the differences in Hunter color L* for granules deoiled with a solvent such as 1,1,1 trichloroethane and granules having the oil treatment still remaining on the granule surface. A lower ΔL* value signifies a better result because as the deoiled to oiled color difference decreases, there is a corresponding reduction in color disparity between shingle color at the time of purchase and shingle color after weathering.

The dust count represents the number of particles that become airborne during granule handling. An Aerodynamic Particle Sizer 3310 from TSI, Inc. measures the concentration of dust in air using laser light scattering techniques.

The 4-day stain result is an accelerated measurement of the tendency of granules to adsorb the asphaltic oils in a shingle substrate. As measured by a LabScan colorimeter, staining is defined as the sum of the darkening (a negative/L*) and yellowing (a positive/b*) of a 4-day stain panel versus its original 0-day stain panel.

The data shown in Table 1 illustrates that: (i) deoiled to oiled color difference ΔL* is much closer to zero for granules treated with an elastomeric rubber and oil; (ii) airborne dust count on granules can be reduced significantly without using as much oil; and (iii) granule staining is reduced considerably.

EXAMPLE 6

COMPARATIVE SAMPLE 1000 grams of untreated, kiln fired, white roofing granules were heated to 360° F. (182° C.) and poured into a gallon size stainless steel beaker on a paint shaker. 30 ml of water were added to a steel beaker, followed almost immediately by dropwise addition of a dispersion of 0.1 grams of silicone resin (CR-139 available from General Electric Co.) in 3.0 grams of naphthenic oil. The components were mixed together on the paint shaker for two minutes. After shaking, the granules were removed and placed in a gallon can that was put in an oven at 175° F. (79° C.) for one hour. At the end of this time, the gallon can was returned to the paint shaker, and 5 grams of 8 micrometer (average particle size) rock dust was added to simulate dusty granules. The hot can was then sealed and shaken for an additional three minutes, and was allowed to cool to ambient temperature.

After cooling, the treated roofing granules were tested for dust level generated during granule handling. The result of this test is tabulated in column 6 of Table 2.

EXAMPLE 7

1000 grams of untreated, kiln fired, white roofing granules were heated to 360° F. (182° C.) and poured into a gallon size stainless steel beaker on a paint shaker. 30 ml of water were added to the beaker, followed almost immediately by dropwise addition of a hot solution of 0.18 grams of KRATON rubber D1184 (linear SB block copolymer) dissolved in 1.32 grams of naphthenic oil, and 0.1 grams of silicone resin (CR-139 available from General Electric Co.) emulsified in the oil. The KRATON rubber was dissolved in the naphthenic oil by heating the rubber and oil together with mixing at 300° F. until the rubber is dissolved. The silicone resin was emulsified in the oil by shaking. The granules and rubber/oil/silicone mixture were mixed together on the paint shaker for two minutes. After mixing, the granules were removed and placed in a gallon can that was put in an oven at 175° F. (79° C.) for one hour. At the end of this time, the hot can was returned to the paint shaker where 5 grams of 8 micrometer (average particle size) rock dust was added to simulate dusty granules. The can was sealed and shaken for an additional three minutes.

After cooling to ambient temperature, the treated roofing granules were then tested for dust level generated during granule handling. The result of this test is tabulated in column 7 of Table 2.

EXAMPLE 8

Same procedure was used as in Example 7 except paraffinic oil was substituted for naphthenic oil. The results of the dust level test is tabulated in column 8 of Table 2.

TABLE 2

| | Test Sample of Example: | | |
|---|---|---|---|
| | 6 | 7 | 8 |
| Additive (wt. % based on weight of untreated roofing granules) | | | |
| 8 micrometer size dust | 0.5 | 0.5 | 0.5 |
| D1184 | 0.0 | 0.018 | 0.018 |
| Naphthenic oil | 0.3 | 0.132 | 0.0 |
| Paraffinic oil | 0.0 | 0.0 | 0.132 |
| Silicone resin (CR-139) | 0.01 | 0.01 | 0.01 |
| Property | | | |
| Dust Count (particles/cc) | 2500 | 110 | 97 |

The data shown in Table 2 demonstrates that airborne dust can be greatly reduced by treating roofing granules with an elastomeric rubber that is dissolved in oil and applied to untreated roofing granules as a solution. Satisfactory results are obtained using either a paraffinic or a naphthenic oil.

EXAMPLE 9

COMPARATIVE SAMPLE 1000 grams of untreated, kiln fired, white roofing granules were heated to 360° F. (182° C.) and poured into a gallon size stainless steel beaker on a paint shaker. 30 ml of water were added to a steel beaker, followed almost immediately by dropwise addition of a dispersion of 0.1 grams of silicone resin (CR-139 available from General Electric Co.) in 3.0 grams of naphthenic oil. The components were mixed together on the paint shaker for two minutes. After shaking, the granules were removed and placed in a gallon can in an oven at 175° F. (79° C.) for one hour. At the end of this time, the gallon can was returned to the paint shaker, and 5 grams of 8 micrometer (average particle size) rock dust was added to simulate dusty granules. The can was then sealed and shaken for an additional three minutes.

A roofing granule 10 was randomly selected from the gallon can. The surface of this granule was photographed using a lens that magnified the granule surface 5000 times. The photograph is displayed here as FIG. 1. The granule surface is generally designated by the numeral 12, and particles on the granule surface are represented by the numeral 13.

EXAMPLE 10

1000 grams of untreated, kiln fired, white roofing granules were heated to 360° F. (182° C.) and poured into a gallon size stainless steel beaker on a paint shaker. 30 ml of water were added to the beaker, followed almost immediately by dropwise addition of a hot solution of 0.3 grams of KRATON rubber D1184 (linear SB block copolymer) dissolved in 2.7 grams of naphthenic oil and 0.1 grams of silicone resin (CR-139 available from General Electric Co.) emulsified in the oil. The KRATON rubber was dissolved in the naphthenic oil by heating the rubber and oil together with mixing at 300° F. until the rubber is dissolved. The silicone resin was emulsified in the oil shaking. The granules and rubber/oil/silicone solution were mixed together on the paint shaker for two minutes. After mixing, the granules were removed and placed in a gallon can that was put in an oven at 175° F. (79° C.) for one hour. At the end of this time, the hot can was returned to the paint shaker where 5 grams of 8 micrometer size rock dust was added to simulate dusty granules. The can was sealed and shaken for an additional three minutes.

A roofing granule was randomly selected from the gallon can. The surface of the granule was photographed using a lens that magnified the granule surface 5000 times. The photograph is illustrated here as FIG. 2.

Figure 2:
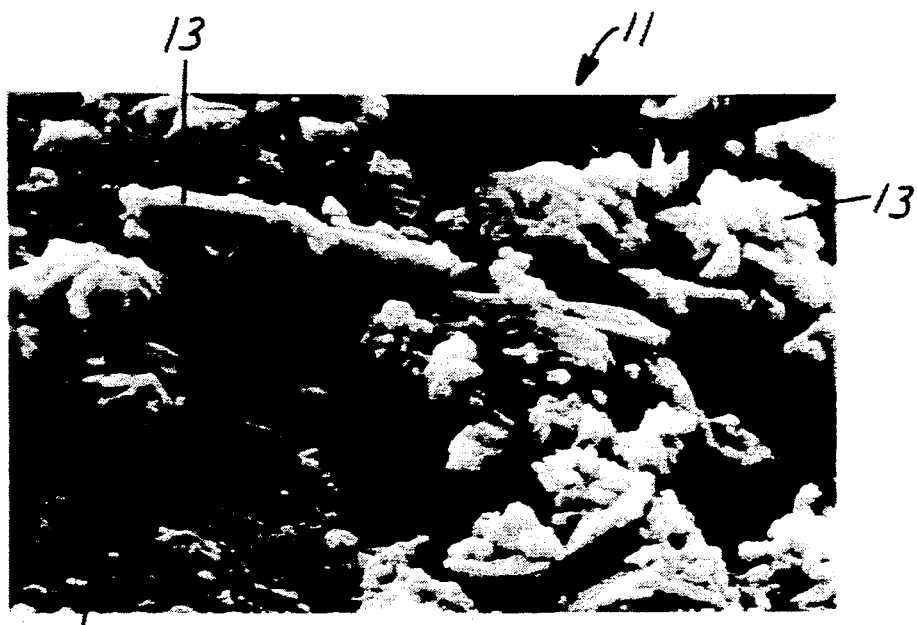
FIG. 2 is a photograph (magnified 5000×) of a roofing granule 11 that has been treated with oil, silicone resin, and an elastomeric rubber according to the procedure outlined in Example 10 below.

Comparing FIG. 1 (oil treated granule 10) with FIG. 2 (oil and rubber treated granule 11), it is readily seen that the oil and rubber treated granule 11 has a greater quantity of particles 13 adhered to the granule surface 12. If dust particles 13 are bound to the granule surface 12, as opposed to being free, dust is less likely to be formed during granule handling. Accordingly, FIGS. 1 and 2 demonstrate visually the ability of this invention's roofing granules to reduce dust formation.

EXAMPLE 11

COMPARATIVE SAMPLE 1000 grams of untreated, kiln fired, white roofing granules were heated to 360° F. (182° C.) and poured into a gallon size stainless steel beaker on a paint shaker. 36 ml of water were added to a steel beaker, followed almost immediately by a dispersion of 0.1 grams of silicone resin (CR-139 available from General Electric Co.) in 3.0 grams of naphthenic oil. The components were mixed together on the paint shaker for two minutes. After shaking, the granules were removed and placed in a gallon can that was put in an oven at 175° F.

(79° C.) for one hour. At the end of this time, the gallon can was returned to the paint shaker, and 5 grams of 8 micrometer (average particle size) rock dust was added to simulate dusty granules. The can was then sealed and shaken for an additional three minutes, was allowed to cool.

After cooling to ambient temperature, the treated roofing granules were tested for dust level generated during granule handling. The result of this test is tabulated in column 11 of Table 3.

EXAMPLE 12

Test procedure was the same as that of Example 11, except 3 grams of HA-24 acrylate (available from the Rohm and Hass Company) elastomeric rubber and 33 ml of $H_2O$ were added to the steel beaker containing the granules. HA-24 acrylate is an ethylacrylate copolymer having a molecular weight between 500,000 and 1,000,000 and contains methylolacrylamide self cross-linking units. The granules were tested for dust level generated during granule handling. The result of this test is tabulated in column 12 of Table 3.

EXAMPLE 13

COMPARATIVE SAMPLE

Test procedure was the same as that of Example 11, except 25 grams of 8 micrometer (average particle size) rock dust was added to the gallon can. Granules were tested for dust level generated during granule handling. The results of those tests are tabulated in column 13 of Table 3.

EXAMPLE 14

Test procedure was the same as that of Example 13, except 3.0 grams of HA-24 acrylate, elastomeric rubber and 33 ml of $H_2O$ were added to the steel beaker containing the granules. The granules were tested for dust level generated during granule handling. The result of this test is tabulated in column 14 of Table 3.

EXAMPLE 15

Test procedure was the same as that of Example 14, except 1.5 grams of HA-24 acrylate, elastomeric rubber and 34.5 ml of $H_2O$ were added to the steel beaker containing the granules and 15 grams of rock dust were added to the gallon can before it was sealed and shaken. The granules were tested for dust level generated during granule handling. The results of these tests are tabulated in column 15 of Table 3.

TABLE 3

| | Test Sample of Example: | | | | |
|---|---|---|---|---|---|
| | 11 | 12 | 13 | 14 | 15 |
| Additive (wt. % based on weight of untreated roofing granules) | | | | | |
| HA-24 Acrylate | 0.0 | 0.3 | 0.0 | 0.3 | 0.15 |
| Naphthenic Oil | 0.3 | 0.3 | 0.3 | 0.3 | 0.3 |
| Silicone Resin | 0.01 | 0.01 | 0.01 | 0.01 | 0.01 |
| Dust Particles | 0.5 | 0.5 | 2.5 | 2.5 | 1.5 |
| $H_2O$ | 3.6 | 3.3 | 3.6 | 3.3 | 3.45 |
| Property | | | | | |
| Dust Count (particles/cc) | 15,050 | 404 | 40,600 | 8,578 | 12,438 |

The data set forth in Table 3 demonstrates that airborne dust can be greatly reduced by treating roofing granules with an oil and polyacrylic rubber.

Various modifications and alterations of this invention will become apparent to those skilled in the art without departing from the scope and spirit of this invention. It therefore should be understood that this invention is not to be unduly limited to the illustrative embodiments set forth above, but is to be controlled by the limitations set forth in the claims and equivalents thereof.

What is claimed is:

1. An article that comprises a colored roofing granule having the surface coated with a treatment composition that consists essentially of an oil and an elastomeric rubber which are compatible to each other.

2. The article of claim 1, wherein the elastomeric rubber comprises a block copolymer having a first block comprising non-elastomeric monomer units and a second block comprising elastomeric monomer units, wherein the first block has an average molecular weight of between 2,000 and 125,000 and has a glass transition temperature of about 67° F., and wherein the second block has an average molecular weight of between 10,000 and 1,000,000 and has a glass transition temperature of less than 50° F.

3. The article of claim 1, wherein the elastomeric rubber includes copolymers having an A-B or an A-B-A block structure, where A denotes a polymer comprising alkenyl aromatic hydrocarbon monomer units and B denotes a polymer having elastomeric monomer units of conjugated dienes or hydrogenated versions thereof.

4. The article of claim 3, wherein the copolymer is selected from the group consisting of: styrene-butadiene-styrene; styrene-isoprene-styrene; styrene-ethylene/butylene-styrene; styrene-butadiene; styrene-ethylene propylene; styrene-ethylene/butylene and mixtures thereof, and the oil is a petroleum oil containing aromatic, paraffinic or naphthenic oils or mixtures thereof.

5. The article of claim 4, wherein the petroleum oil is present at between 0.05 and 0.3 weight percent based on the weight of non-coated roofing granules, and the elastomeric rubber compound is present at between 0.005 and 0.05 weight percent based on the weight of non-coated roofing granules.

6. The article of claim 5, wherein the petroleum oil is present at between 0.075 and 0.2 weight percent and the elastomeric rubber is present at between 0.01 and 0.02 weight percent, and wherein the roofing granules' surface have also been coated with a silicone additive.

7. A roofing material, comprising: an asphalt substrate and a plurality of colored roofing granules, wherein the roofing granules have surfaces coated with a thin film of a composition comprising an oil and an elastomeric rubber which are compatible to each other, and the coated roofing granules are placed on at least a portion of at least one surface of the asphalt substrate.

8. The roofing material of claim 7, wherein the asphalt substrate is in the shape of a shingle, and wherein the oil includes a paraffinic or naphthenic oil or a mixture thereof and the elastomeric rubber is a copolymer having non-elastomeric monomer units and elastomeric monomer units.

9. The shingle of claim 8, wherein the copolymer is styrene-butadiene-styrene, styrene-isoprene-styrene, styrene-ethylene/butylene-styrene, styrene-butadiene, styrene-ethylene/propylene, styrene-ethylene/butylene or a mixture thereof.

10. A method of coating colored roofing granules, which comprises: applying to surfaces of the roofing granules a composition that consists essentially of an oil and an elastomeric rubber which are compatible to each other.

11. The method of claim 10, wherein the elastomeric rubber is introduced to the roofing granules in the form of an aqueous dispersion.

12. The method of claim 10, wherein the elastomeric rubber is dissolved in oil before being applied to the roofing granules.

13. The method of claim 10, wherein the roofing granules are coated with a paraffinic or naphthenic oil or a mixture thereof and a copolymer having monomeric units of styrene and butadiene, isoprene, ethylene/butylene, ethylene/propylene or mixtures thereof.

14. The method of claim 10, wherein the elastomeric rubber and oil are applied to the roofing granules at a weight ratio of rubber to oil of 0.1:6.0 to 1.0:1.0.

15. The method of claim 14, wherein the elastomeric rubber to oil ratio is from 0.2:4.0 to 0.4 to 1.5, and wherein the elastomeric rubber and oil are introduced to the roofing granules in the form of a water-in-oil or oil-in-water dispersion.

16. The method of claim 10, wherein the oil and elastomeric rubber are introduced to the roofing granules in a rotary mixer and are mixed with and coated onto the roofing granules in that rotary mixer, and wherein the elastomeric rubber material is introduced to the roofing granules in the form of an aqueous dispersion.

17. A method for forming asphalt-based roofing materials, which comprises:
(a) providing a substrate comprising an asphalt material; and
(b) applying colored roofing granules to at least a portion of at least one surface of the asphalt substrate;
wherein the roofing granules applied to the asphalt substrate have been coated on the surface thereof with at least an oil and an elastomeric rubber which are compatible to each other before being applied to the substrate.

18. The method of claim 17, further comprising cutting the asphalt substrate to the size of a shingle.

19. The method of claim 18, wherein the oil is a paraffinic or naphthenic oil and the elastomeric rubber material is a block copolymer having a non-elastomeric block polymer and an elastomeric block polymer, and wherein the oil is present on the roofing granules at from 0.075 to 0.2 wt. % and the elastomeric rubber is present on the roofing granules at from 0.01 to 0.02 wt. % based on the weight of non-coated roofing granules.

20. A method of covering a roof, which comprises applying shingles of claim 8 to the roof.

21. Roofing granules that comprise:
a plurality of unsecured colored roofing granules and a treatment composition, the treatment composition comprising an elastomeric rubber and an oil which are compatible to each other, the treatment composition being applied as a thin film that sufficiently covers surfaces of the unsecured roofing granules, wherein the elastomeric rubber is selected from the group consisting of natural rubber, butyl rubbers, neoprenes, ethylene propylene rubbers, nitrile elastomers, polyacrylic rubbers, polysulfied rubbers, thermoplastic elastomers, polyurethanes, fluoroelastomers, and mixtures thereof.

22. The composition of claim 21, wherein the elastomeric rubber is a block copolymer that contains a first block A that is a non-elastomeric polymer block and a second block B that is a elastomeric polymer block.

23. The composition of claim 21, wherein the oil includes a paraffinic or naphthenic oil or a mixture thereof, and the elastomeric rubber is a copolymer having non-elastomeric monomer units and elastomeric monomer units.

24. The composition of claim 23, wherein the copolymer is a block copolymer.

25. The composition of claim 24, wherein the block copolymer is styrene-butadiene-styrene, styrene-isoprene-styrene, styrene-ethylene/butylene-styrene, styrene-butadiene, styrene-ethylene/propylene, styrene-ethylene/butylene or a mixture thereof.

26. The composition of claim 25 wherein the oil is present in the range of 0.056 and 0.03 weight percent, and the elastomeric rubber is present in the range of 0.0025 to 0.3 weight percent, based on the weight of unsecured roofing granules.

27. The composition of claim 26, wherein the oil is present in the range of 0.075 weight percent, and the elastomeric rubber is present in the range of 0.01 to 0.02 weight percent, based on the weight of unsecured roofing granules.

28. An article which comprises a non-colored roofing granule having the surface coated with a thin film of a composition that contains an elastomeric rubber and an oil which are compatible to each other.

* * * * *

UNITED STATES PATENT AND TRADEMARK OFFICE
CERTIFICATE OF CORRECTION

PATENT NO. : 5,286,544

DATED : February 15, 1994

INVENTOR(S) : Joseph Graham

It is certified that error appears in the above-identified patent and that said Letters Patent is hereby corrected as shown below:

Col. 14, line 36, "0.056" should be --0.05--.

Signed and Sealed this

Twelfth Day of July, 1994

Attest:

BRUCE LEHMAN

Attesting Officer

Commissioner of Patents and Trademarks